(12) United States Patent
Rossi et al.

(10) Patent No.: US 11,550,859 B2
(45) Date of Patent: Jan. 10, 2023

(54) ANALYTICS SYSTEM ENTITY RESOLUTION

(71) Applicant: Adobe Inc., San Jose, CA (US)

(72) Inventors: Ryan A. Rossi, Mountain View, CA (US); Sungchul Kim, San Jose, CA (US); Eunyee Koh, San Jose, CA (US); Anup Bandigadi Rao, San Jose, CA (US); Russell R. Stringham, Orem, UT (US)

(73) Assignee: Adobe Inc., San Jose, CA (US)

( * ) Notice: Subject to any disclaimer, the term of this patent is extended or adjusted under 35 U.S.C. 154(b) by 224 days.

(21) Appl. No.: 16/569,484

(22) Filed: Sep. 12, 2019

(65) Prior Publication Data

US 2021/0081473 A1    Mar. 18, 2021

(51) Int. Cl.
*G06F 16/9535* (2019.01)
*G06F 16/955* (2019.01)

(52) U.S. Cl.
CPC ........ *G06F 16/9535* (2019.01); *G06F 16/955* (2019.01)

(58) Field of Classification Search
CPC .......................... G06F 16/9535; G06F 16/955
See application file for complete search history.

(56) References Cited

U.S. PATENT DOCUMENTS

| | | | |
|---|---|---|---|
| 10,091,312 B1* | 10/2018 | Khanwalkar | H04L 67/02 |
| 10,754,638 B1* | 8/2020 | Dwivedi | G06F 8/71 |
| 2011/0264663 A1* | 10/2011 | Verkasalo | G06F 9/455 |
| | | | 707/E17.014 |
| 2016/0132938 A1* | 5/2016 | Wiener | G06Q 30/0269 |
| | | | 705/14.66 |
| 2018/0053096 A1* | 2/2018 | Farrell | G06F 16/9024 |
| 2019/0102462 A1* | 4/2019 | Botea | H04L 67/306 |
| 2019/0332795 A1* | 10/2019 | Woodward | G06F 21/6227 |

* cited by examiner

*Primary Examiner* — Belix M Ortiz Ditren
*Assistant Examiner* — Yohanes D Kelemework
(74) *Attorney, Agent, or Firm* — FIG. 1 Patents

(57) ABSTRACT

Techniques and systems are described for analytics system entity resolution. Typed higher-order node combinations are determined within a dataset, and an amount of similarity between two arbitrary nodes within the dataset is determined based on the typed higher-order node combinations. The amount of similarity enables the digital analytics to accurately perform source resolution of portions of the dataset to a respective source, and may be utilized to control output of digital content to a client device.

20 Claims, 9 Drawing Sheets

|  | People+ | 4-Cycle (y) | | | | 4-Cycle (y) - removed 2P-2S | | |
| --- | --- | --- | --- | --- | --- | --- | --- | --- |
|  |  | y = 10 | y = 200 | y = 300 | y = 300 | y = 300 | y = 500 | y = 1K |
| Precision (P) | 0.9999 | 0.9999 | 0.9776 | 0.9656 | 0.9974 | 0.9829 | 0.9229 |
| Recall (R) | 0.5544 | 0.5600 | 0.5687 | 0.5741 | 0.5670 | 0.5772 | 0.6096 |
| F score (F) | 0.7134 | 0.7179 | 0.7191 | 0.7200 | 0.7230 | 0.7273 | 0.7342 |

Fig. 7

ANALYTICS SYSTEM ENTITY RESOLUTION

BACKGROUND

Analytics systems are configured to identify patterns in vast quantities of data, and from these patterns, gain insights that are not possible to be made by a human alone. Analytics systems, for instance, may be configured to provision network and computational resources of service providers systems, control output of digital content (e.g., recommendations and digital marketing content), detect fraudulent and malicious activity, and so forth. To do so, analytics systems are tasked with analyzing vast quantities of data (e.g., petabytes) that may be obtained from a diverse range of sources and rely on the accuracy of this data in order to support the insights.

Conventional techniques used to collect and analyze this data, however, are inefficient and lack accuracy in instances regarding how to attribute the data collected to a source, i.e., source resolution. Conventional techniques, for instance, assign a source identifier (ID) to a collection of data involving user interaction with digital content using a respective computing device. The data, for instance, may describe user interaction with a website involving a mobile device as a session and assign that session to a respective source ID. Data may also be collected involving user interaction with the website involving a desktop computer by the same user, which is assigned another source ID as another session of data. Conventional analytics systems, however, are not capable of accurately determining that both sessions, even though involving different source IDs, actually have a same source of user interaction. Thus, an inability of conventional analytics systems to accurately resolve a source of the sessions causes conventional analytics systems to maintain these sessions separately and are incapable of realizing insights that may be gained from linking the sessions together, which may cause the analytics systems to fail for their intended purpose and lack accuracy in achieving a desired result.

SUMMARY

Techniques and systems are described for analytics system entity resolution. In one example, analytics systems are configured to perform entity resolution, automatically and without user intervention, by leveraging connectivity patterns between nodes and typed higher-order node combinations generated within a dataset collected by the analytics system. This permits the analytics system to address higher-order interactions between nodes in the dataset collected by the analytics system in ways that are not possible using conventional lower order techniques.

A typed higher-order node combination is a set of nodes that fits a particular connectivity pattern including a specified structure and/or number of nodes. The nodes are associated with types, or categories, and the connectivity pattern may specify a respective category for each respective node. Thus, the digital analytics system described herein determines a number of typed higher-order node combinations within a dataset, and employs the typed higher-order node combinations to determine an amount of similarity between two arbitrary nodes within the dataset. The amount of similarity enables the digital analytics to accurately perform source resolution of portions of the dataset to a respective source with increased accuracy and efficiency than is possible through conventional techniques.

This summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 7 is a table depicting experimental results of various techniques for performing entity stitching.

DETAILED DESCRIPTION

Overview

Figure 1:
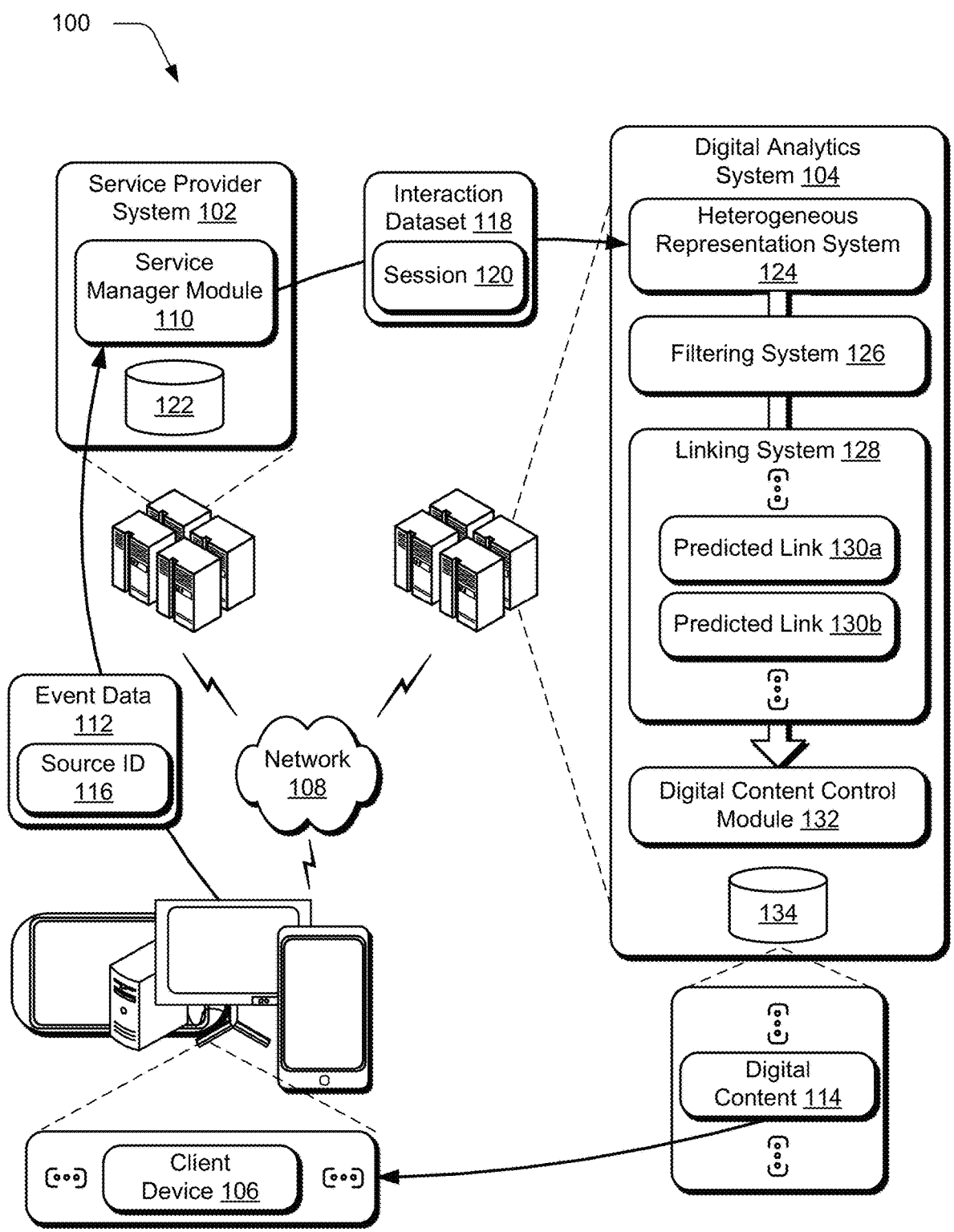
FIG. 1 is an illustration of an environment in an example implementation that is operable to employ analytics system entity resolution techniques as described herein.

Entity resolution is used by analytics systems to associate different sessions of user interaction with digital content as described in a dataset to a correct source of the interaction. As previously described, analytics systems may obtain data forming the dataset from a diverse range of sources that describe user interaction with digital content involving a variety of computing devices. Data within the dataset is assigned as sessions to respective source identifiers (IDs). In some instances, however, conventional analytics systems are incapable of associating (i.e., "linking") source IDs to each other as corresponding to a same source.

Source IDs, for instance, may be assigned to different computing devices even though the user interaction involving those devices is associated with a same source, e.g., user. In other instances, this may also occur even for data generated as part of user interaction with a same computing device. A "cookie," for instance, stored on the computing device may be deleted. Therefore, generation of a new cookie is associated with a new source ID and thus the respective sessions are disconnected and fragmented from each other within the dataset even though these sessions occur using the same device. This limits accuracy of the dataset in describing the source and thus accuracy of techniques employed by the analytics system based on this dataset to address this source.

Accordingly, analytics system entity resolution techniques and systems are described that overcome the challenges and inaccuracies of conventional techniques. In one example, analytics systems are configured to perform entity resolution, automatically and without user intervention, by leveraging connectivity patterns between nodes and typed higher-order node combinations generated within a dataset collected by the analytics system. This permits the analytics system to address higher-order interactions between nodes in the dataset collected by the analytics system in ways that are not possible using conventional lower order techniques.

Nodes, for instance, may be generated from a dataset to describe instances of user interaction with digital content. A typed higher-order node combination is a set of nodes that fits a particular connectivity pattern including a specified structure and/or number of nodes. A connectivity pattern may specify, for instance, a particular number of nodes, a particular type for each respective node, and a particular structure connecting the nodes to one another, without specifying specific nodes within the event data or user interaction dataset. A node's type (e.g., a node's category) describes an entity associated with the node (e.g., a source ID such as a node containing a cookie ID) and/or the kind of information stored for the node. Example node types or categories include source (e.g., user), a web page, a location, an IP address, and so forth. A typed higher-order node combination thus includes a set of nodes from within the dataset that fit a connectivity pattern, and multiple typed higher-order node combinations may exist that each fit the same connectivity pattern.

A typed higher-order node combination provides a stronger indication of information for the analytics system that is more robust to noise and results in fewer false positives than lower-order approaches used by conventional analytics systems, such as a common neighbor or Jaccard similarity approaches. In one conventional example, nodes are identified that share a connection with a single node without any consideration of type. When considering a large dataset (e.g., "big data" including petabytes of data), however, a large number of nodes within the dataset may have common neighbors. Conventional techniques, by failing to address type, may incorrectly link these nodes based on the common neighbors and thus produce poor and inaccurate results. In contrast, a typed higher-order node combination technique employed by the analytics system as described herein identifies nodes that share multiple nodes of particular types, thus providing a stronger and more discriminating signal with greater accuracy and recall.

Thus, the digital analytic system described herein determines a number of typed higher-order node combinations within a dataset, and employs the typed higher-order node combinations to determine an amount of similarity between two arbitrary nodes within the dataset. The amount of similarity enables the digital analytics system to accurately perform source resolution of portions of the dataset to a respective source with increased accuracy and efficiency than is possible through conventional techniques. For instance, the digital analytics system predicts a link between the arbitrary nodes based on the amount of similarity, and links the sessions corresponding to the arbitrary nodes as belonging to a single source. This allows techniques that rely on accurate source resolution to also realize increased accuracy, e.g., network and computational resource provisioning, generation and control of digital content to make recommendations and control dissemination of digital marketing content, fraud detection, and so forth.

The techniques described herein may also be used to increase computational efficiency. Identification of typed higher-order node combinations associated with two center nodes of a particular type, for instance, may include identifying typed higher-order node combinations that include additional nodes that are not of the particular type. A computing device that implements this techniques may then omit further processing of any nodes of the particular type beyond the center nodes, or of any type that is not included in any connectivity patterns. This increases computational efficiency and operation of the computing device. Such efficiencies are not possible using conventional lower-order techniques which are agnostic to node type. Further discussion of these and other examples is included in the following sections.

Term Examples

A "heterogeneous network" or "typed network" describes a network with a set of nodes and a set of edges connecting the nodes. The nodes and/or the edges of the network have respective types, and the network includes a type mapping function that denotes the types of respective nodes or edges.

A "node" represents an entity in a network. As described herein, each node may be specified as being of a certain type. For instance, a graph representation of a network may include any number of different entity types (e.g., categories) such as a source ID, a web page, a location, an IP address, and so forth. Although generally described herein with respect to an internet-centric network, the nodes may include any suitable entity types, such as humans, neurons, routers, autonomous systems, devices, sensors, economies, vehicles, and so forth.

An "edge" of a graph represents a connection or relationship between two nodes in the graph, and may also be referred to as a "node association".

A "graph" refers to a representation of a network that includes the nodes that each represent a network entity and the entity's type, and the edges that each represent a node association between two nodes and the node association's type. The graph can accordingly represent a correlation of client devices, device locations, device connections, times of associated events, IP connections, webpages visited, among any other characteristics reflective of the many types of networks, such as biological, genetic, medical, neural, science, research, communication, marketing, analytic, web-based, or any other types of complex networks.

A "typed neighborhood" is a set of nodes and corresponding types of the nodes that are connected to an arbitrary node by following edges originating from the arbitrary node.

A "connectivity pattern" describes a particular pattern of interconnections occurring in a complex network, that accounts for the types of nodes and edges involved in the interconnections. For instance, a connectivity pattern may specify a particular number of nodes, a particular type for each respective node, and a particular structure connecting the nodes to one another. A connectivity pattern is a construct that specifies a pattern without defining particular nodes that fit the pattern, such as by describing a pattern of interconnections based on types without specifying specific nodes in a dataset. As an example, a connectivity pattern for a typed four-structure describes a typed four-cycle with specific respective types for each of the four nodes, such as a particular type for the centers nodes and particular types for the respective additional nodes. A single connectivity pattern may describe a plurality of different typed higher-order node combinations within a network. A connectivity pattern may have k nodes with a specified structure pertaining to the edges between the nodes and/or a specified structure pertaining to the nodes themselves. For example, a connectivity pattern may include two arbitrary center nodes and a number of additional nodes with specified types, such as a first additional node of a first type and a second additional node of a second type, and/or a number of additional nodes of a third type, and so on. Example forms of connectivity patterns include higher-order subgraphs and typed four-cycles.

A "typed higher-order node combination" is a set of nodes that fits a connectivity pattern. For instance, while a connectivity pattern defines types and connections, a typed higher-order node combination defines particular nodes within a dataset that fit a connectivity pattern. Thus, a dataset may include a plurality of typed higher-order node combinations that fit a particular connectivity pattern.

A "typed four-cycle" is a connectivity pattern that describes a set of four nodes including two center nodes and two additional nodes. Each of the two additional nodes are linked via respective edges to both of the center nodes. Further, each of the four nodes of the typed four-cycle is associated with a type. In some implementations, both of the center nodes are associated with a same type. In a user stitching or entity resolution implementation, an example typed four-cycle may include two center source ID nodes, an additional node indicating a web page node that client devices associated with the source ID nodes have visited (as indicated by respective edges between the web page node and the source ID nodes), and an additional node indicating an IP address node that both of the source ID nodes are associated with (as indicated by respective edges between the IP address node and the source ID nodes).

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ analytics system entity resolution techniques as described herein. The illustrated environment 100 includes a service provider system 102, a digital analytics system 104, and a plurality of client devices, an example of which is illustrated as a client device 106. In this example, events are described involving user actions performed through interaction with the client devices 106. For instance, the events describe actions performed by the client devices 106, which may originate from user interaction with the client devices 106. These devices are communicatively coupled, one to another, via a network 108 and may be implemented by a computing device that may assume a wide variety of configurations.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the service provider system 102 and the digital analytics system 104 and as further described in FIG. 9.

The client device 106 is illustrated as engaging in interaction with a service manager module 110 of the service provider system 102. The service provider system 102, for instance, may be configured to support interaction with digital content 114. As part of this interaction, event data 112 is generated. The event data 112 describes characteristics of the interaction in this example, such as web pages accessed by the client device 106, a location of the client device 106, an IP address of the client device 106, demographics of the client device 106 and/or a user of the client device 106, characteristics of the network 108, events, and so forth. The service manager module 110 associates portions of the event data 112 with a source identifier (ID) 116 that corresponds to a source (e.g., the client device 106 or a user of the client device 106) of the corresponding interaction. An interaction dataset 118 is then generated (e.g., by the service manager module 110) that describes this interaction, characteristics of the interaction, the event data 112, and so forth, which may be stored in a storage device 122.

Data within the interaction dataset 118 may be assigned as sessions 120 based on the source IDs 116. For instance, portions of the interaction dataset 118 that originated from a particular source will share a source ID 116, and those portions of the interaction dataset 118 are collectively considered as a session 120. In some implementations, the source ID 116 is contained in a source node which in turn is linked to each node that shares the respective source ID 116.

The digital content 114 may take a variety of forms and thus interaction and associated events with the digital content 114 may also take a variety of forms in this example. A user of the client device 106, for instance, may interact with or consume the digital content 114 via the client device 106 such as by reading an article, viewing a digital video, listening to digital music, viewing posts and messages on a social network system, subscribing or unsubscribing, purchasing an application, and so forth. In another example, the digital content 114 is configured as digital marketing content to cause conversion of a good or service, e.g., by "clicking" an ad, purchase of the good or service, and so forth. Digital marketing content may also take a variety of forms, such as electronic messages, email, banner ads, posts, articles, blogs, and so forth. Accordingly, digital marketing content is typically employed to raise awareness and conversion of the good or service corresponding to the content. In another example, interaction and thus generation of the interaction dataset 118 may also occur locally on the client device 106.

The interaction dataset 118 is received by the digital analytics system 104, which in the illustrated example employs this data to control output of the digital content 114 to the client device 106. To do so, the digital analytics system 104 utilizes a heterogeneous representation system 124, a filtering system 126, and a linking system 128 to generate predicted links within the interaction dataset 118 such as a predicted link 130a and a predicted link 130b which may resolve different source IDs or sessions as corresponding to a single entity. Resolving different source IDs or sessions as corresponding to a single entity enables a variety of functionality, 130 such as to guide creation or output of the digital content 114, e.g., by controlling which items of the digital content 114 are output to the client device 106. The predicted links 130, for instance, may be used to determine insights regarding a user of the client device 106 in order to target items of the digital content 114 that are of particular interest to the user of the client device 106 (e.g., by utilizing the predicted links 130 to resolve multiple different sessions as corresponding to the same user in order to more accurately determine the interests of the user).

As an example, the predicted links 130 are configured to link different sessions 120 identified in the interaction dataset 118 as belonging to a single source. In this example, the interaction dataset 118 describes a plurality of sessions 120 in relation to a plurality of nodes (e.g., IP addresses, webpages visited, physical locations, and so forth). While each respective session 120 includes a plurality of nodes (i.e., the session 120 may include a plurality of nodes that are linked to one another and associated with a particular source ID 116)118, different ones of the sessions 120 are not linked to one another. The digital analytics system 104 extracts information from the interaction dataset 118 which is utilized to generate the predicted links 130 between source IDs 116 or sessions 120.

For instance, the interaction dataset 118 may include multiple source IDs 116 and/or corresponding sessions 120 that describe data originating from a same source, e.g., user. While interaction between a user and the client device 106 may be inferred from the event data 112, the event data 112 is based on interaction between the client device 106 and the service manager module 110 and thus error may be introduced in assigning source IDs 116 to portions of the event data 112. As an example, if a user interacts with multiple different computing devices, a different source ID 116 is assigned for each respective one of the multiple different computing devices despite the interaction originating with a same user. The predicted links 130 allow the digital analytics system 104 to overcome these technical limitations of collecting the event data 112 and resolve the different source IDs 116 as corresponding to a single entity.

The predicted links 130 may then be used by a digital content control module 132 to control output of the digital content 114 to the client device 106. This may include the digital content control module 132 selecting a particular email to send from among a set of possible emails, determining a particular advertisement to serve to the client device 106, recommending a particular item of content to the user of the client device 106, and so forth. Although the digital content 114 is illustrated as maintained in a storage device 134 by the digital analytics system 104, this digital content 114 may also be maintained and managed by the service provider system 102, the client device 106, and so forth.

As another example, the predicted links 130 may be configured to determine a similarity of characteristics among different sessions 120 belonging to different sources, e.g., to facilitate clustering of similar users. However, it is to be appreciated that the predicted links 130 may be between any two nodes in the interaction dataset 118, and may be enable functionality other than linking source IDs 116 or sessions 120. For instance, the predicted links 130 may be configured to determine a similarity of users between different websites, may be configured to determine IP addresses with similar online browsing habits, may be configured to determine physical locations visited by similar users, and so forth. Further, although the interaction dataset 118 is generally illustrated as relating to interaction with an Internet-related network or advertising and marketing analytics, the interaction dataset 118 and the predicted links 130 may pertain to any suitable network, such as scientific research networks, political blog networks, power grid networks, communication analysis between members or groups in social networks, and so forth.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
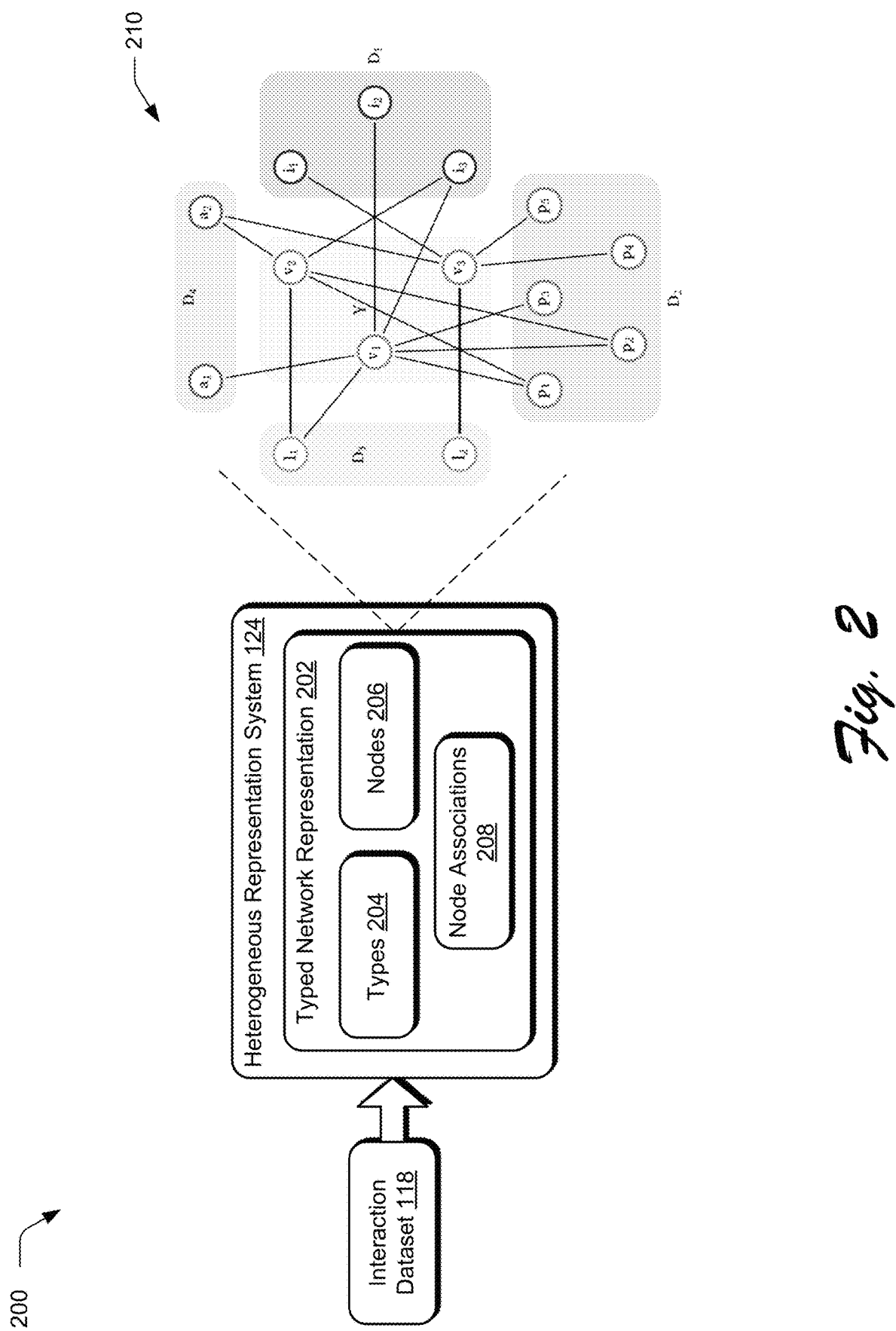
FIG. 2 depicts an example heterogeneous representation system to determine a typed network representation of a network and typed higher-order node combinations.

FIG. 2 depicts a system 200 showing an example heterogeneous representation system 124 of the digital analytics system 104 of FIG. 1 in greater detail to determine a typed network representation 202. The interaction dataset 118 includes information pertaining to a heterogeneous network (also referred to as a typed network) and is received by the heterogeneous representation system 124 to create a typed network representation 202 (e.g., a typed network graph). A heterogeneous network may be defined as G=(V, E), consisting of a set of node objects V and a set of edges E (also referred to as node associations or links) connecting the nodes in V. A heterogeneous network also has a node type mapping function $\phi$: V→$T_V$ and an edge type mapping function defined as $\xi$: E→$T_E$ where $T_V$ and $T_E$ denote the set of node object types and edge types, respectively. The type of node i is denoted as $\phi_i$, and, the type of edge e=(i,j)∈E is denoted as $\xi(i,j)=\xi(e)$. Thus, the typed network representation 202 corresponds to a typed or heterogeneous network, and includes types 204, nodes 206, and node associations 208.

An example typed network representation 202 is provided as graph 210. Graph 210 includes various types 204 (e.g., categories) illustrated as regions Y, $D_1$, $D_2$, $D_3$, and $D_4$, respectively. In this example, Y denotes source IDs, $D_1$ denotes IP addresses, $D_2$ denotes web pages, $D_3$ denotes a spatial location (e.g., latitude/longitude coordinates, zip code, and so forth), and $D_4$ denotes a source agent. Within each of the various types 204 are a plurality of nodes 206. For instance, the region Y corresponding to the source ID type includes the nodes $v_1$, $v_2$, and $v_3$, while the region $D_1$ corresponding to the IP address type includes the nodes $i_1$, $i_2$, and $i_3$. Various ones of the nodes 206 are associated with one another by the node associations 208 (also referred to as edges or links) illustrated as solid lines connecting the nodes. For instance, the node $v_2$ is associated with the nodes $a_2$, $i_3$, $p_1$, $p_2$, and $l_1$. In this example, the typed network representation 202 is configured in relation to the type Y (source IDs) and may be utilized in entity resolution (e.g. the prediction of source IDs corresponding to a same source). For instance, the typed network representation 202 may be configured to determine if at least two of the source IDs $v_1$, $v_2$, or $v_3$ correspond to the same source, despite the interaction dataset 118 not including any direct node associations 208 between the nodes $v_1$, $v_2$, and $v_3$.

The heterogeneous representation system 124 may determine a typed neighborhood for each respective center node. Given an arbitrary center node i in G, the typed neighborhood $\Gamma_i^t$ is the set of nodes with type t that are reached by following edges originating from i within 1-hop distance. Formally, $\Gamma_i^t=\{j \in V | (i,j) \in E \wedge \phi_j=t\}$, where $\phi$ is the type mapping function and thus $\phi_j$ is the type associated with node j.

Thus, a node $j \in \Gamma_i^t$ iff there exists an edge $(i,j) \in E$ between node i and j and the type of node j denoted as $\phi_j$ is t. For a center node that is a source ID node containing a source ID 116, the corresponding typed neighborhood is a session 120 corresponding to the source ID 116.

The typed network representation 202 may be configured for use in estimation of a weight or similarity between arbitrary center nodes. As an example, there is no node association directly linking the nodes $v_1$ and $v_2$, and the typed network representation 202 may be configured to be utilized in estimating a weight or similarity between the nodes $v_1$ and $v_2$, in estimating a probability that a node association 208 should exist between the nodes $v_1$ and $v_2$, and so forth. For instance, the typed network representation 202 may be configured to determine a probability that the source IDs $v_1$ and $v_2$ correspond to the same source.

Figure 3:
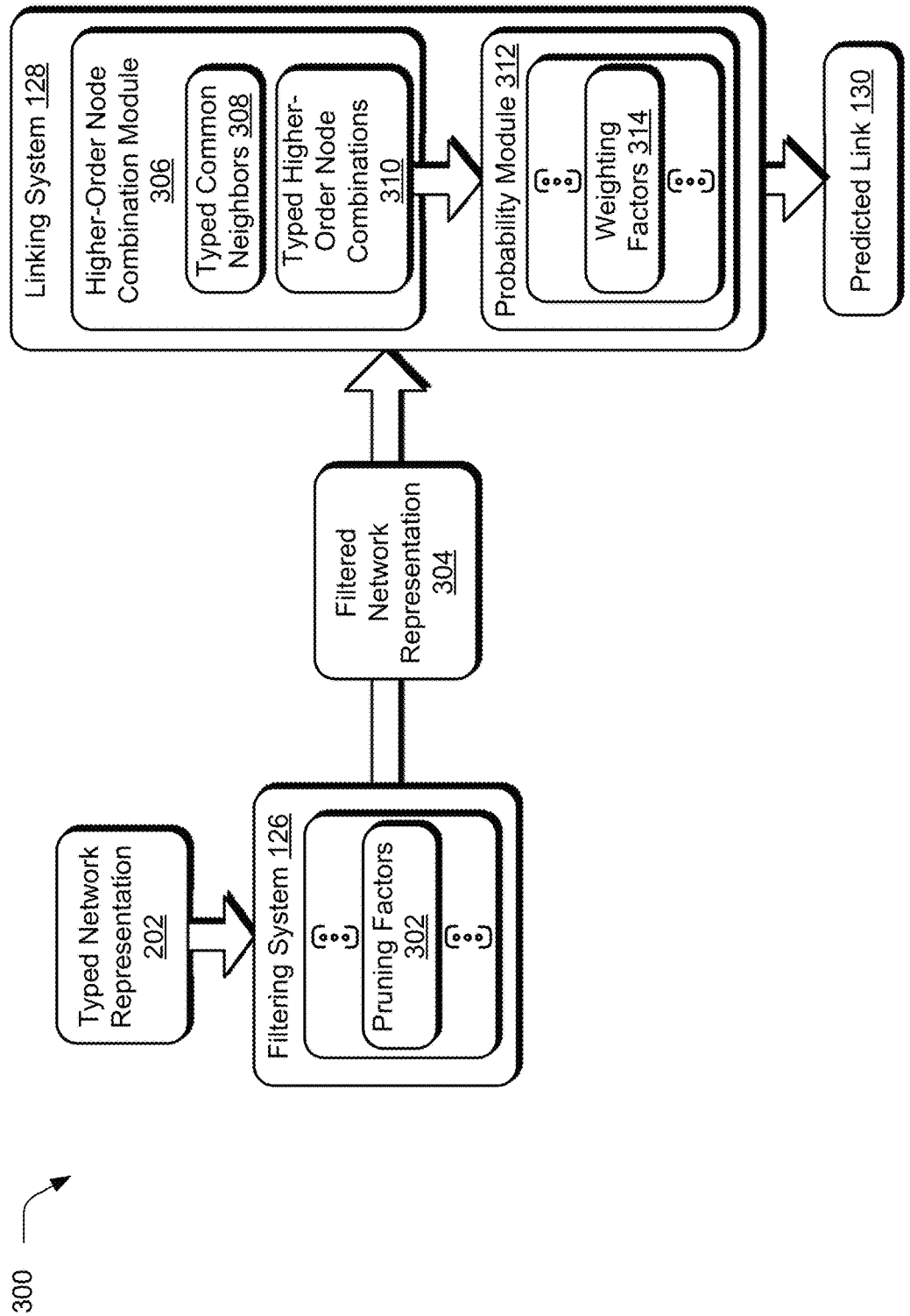
FIG. 3 depicts an example system showing generation of a predicted link.

FIG. 3 depicts a system 300 showing an example digital analytics processing pipeline of the digital analytics system 104 of FIG. 1 in greater detail to generate a predicted link 130. The digital analytics processing pipeline begins with the filtering system 126 receiving the typed network representation 202 from the heterogeneous representation system 124. The filtering system 126 applies a number of pruning factors 302 to the typed network representation 202.

The pruning factors 302 are configured to remove spurious and/or noisy edges or nodes that are not informative. The pruning factors 302 may include factors independent of node or edge types as well as factors corresponding to particular node or edge types. For instance, a pruning factor may include a threshold number of edges with respect to a particular node, such that the node is removed if the number of edges exceeds the threshold value. The threshold value may vary based on node or edge type, allowing a particular pruning factor 302 to vary based on node or edge type.

For example, the interaction dataset 118 may include IP addresses. A link prediction technique based on an IP address linked to many source IDs may have poor recall. For instance, an IP address for a public location such as an airport or café will connect to many source IDs corresponding to many different users, and has limited use in prediction techniques. In this example, the pruning factors 302 include a first factor to filter out IP address nodes that exceed a first threshold number of edges to source ID nodes. Furthering this example, the interaction dataset 118 includes a plurality of webpages. A particular webpage with a high volume of traffic similarly provides limited information. Accordingly, the pruning factors 302 in this example include a second factor to filter out webpage nodes that exceed a second threshold number of edges to source ID nodes. Further, the pruning factors 302 may include a third factor to filter out any node that exceeds a third threshold number of edges to any other nodes, and so forth.

It is to be appreciated that the pruning factors 302 may be applied prior to creation of the typed network representation 202. For instance, the filtering system 126 may apply the pruning factors 302 directly upon the interaction dataset 118 prior to receipt by the heterogeneous representation system 124, may operate in conjunction with the heterogeneous representation system 124 during creation of the typed network representation 202, and so forth. Thus, the pruning factors 302 may be applied to at least one of the interaction dataset 118 or the nodes 206.

A filtered network representation 304 is created based on application of the pruning factors 302, such as by removing nodes 216 or node associations 218 from the typed network representation 202, and the filtered network representation 304 is received by the linking system 128. The linking system 128 is configured to generate a predicted link 130 between two nodes of the filtered network representation 304.

In some implementations, the predicted link 130 is determined in a binary fashion (e.g., the link is determined as either existing or as not existing, such as by exceeding a threshold confidence that the link exists, or by simply meeting a criteria such as a number of common links). Alternatively, the predicted link 130 may be determined and configured as an estimate of link strength or link quality, a probability that nodes are similar, a probability that nodes are related, a list ranking possible potential links, and so forth.

The linking system 128 begins by employing a typed higher-order node combination module 306 to identify typed common neighbors 308 between the arbitrary center nodes within the filtered network representation 304. The typed common neighbors 308 may be determined according to $C_{ij}^t = \Gamma_i^t \cap \Gamma_j^t$ and $C_{ij}^p = \Gamma_i^p \cap \Gamma_j^p$, where $C_{ij}^t$ and $C_{ij}^p$ are the set of common neighbors with type t and type p, respectively, between the center nodes i and j. It is to be appreciated that additional types may be included as typed common neighbors beyond that of types t and p. The linking system identifies typed higher-order node combinations 310 within the filtered network representation 304 based on the typed common neighbors 308. The typed higher-order node combinations 310 may be, for instance, higher-order subgraphs such as typed four-cycles, however the linking system 128 may employ any higher-order node combination approach, such as by utilizing typed k-cycles or any other suitable connectivity pattern. A typed four-cycle consists of the center nodes (i and j) along with two additional nodes, such that each center node connects to both of the two additional nodes. Examples of connectivity patterns are provided in FIG. 4.

Figure 4:
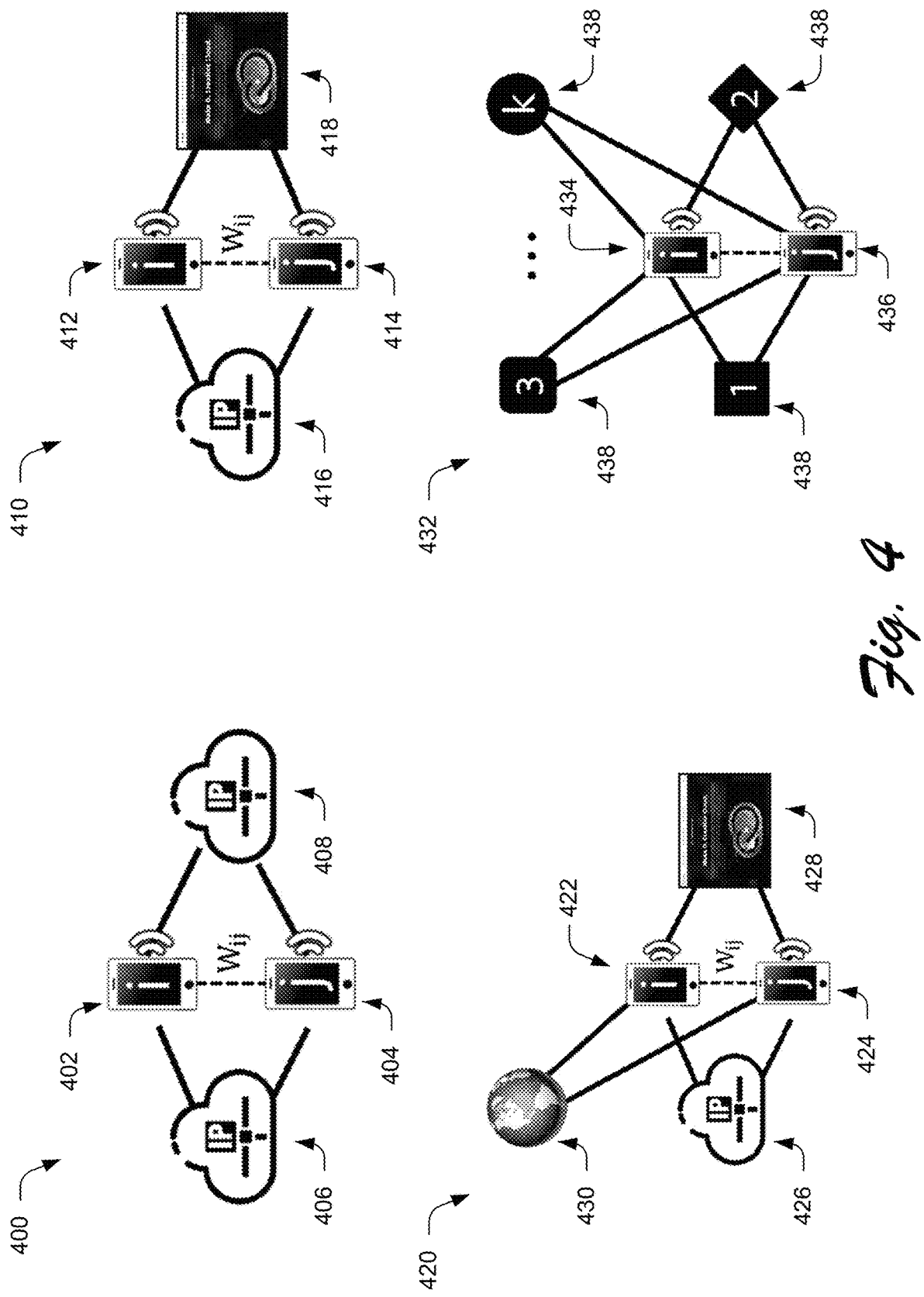
FIG. 4 depicts an illustration of example typed higher-order node combinations.

The connectivity pattern 400 of FIG. 4 is a typed four-cycle including center nodes 402 and 404, which correspond to a source ID (e.g., cookie ID) type, as well as additional nodes 406 and 408 which each correspond to an IP address type. The center nodes 402 and 404 are each linked to both of the additional nodes 406 and 408 (illustrated as solid lines), however the center nodes 402 and 404 are not linked to one another (illustrated as a dotted line).

The connectivity pattern 410 of FIG. 4 is a typed four-cycle including center nodes 412 and 414, which each correspond to a source ID (e.g., cookie ID) type, as well as an additional node 416 corresponding to an IP address type and an additional node 418 corresponding to a web page type. The center nodes 412 and 414 are each linked to both of the additional nodes 416 and 418 (illustrated as solid lines), however the center nodes 412 and 414 are not linked to one another (illustrated as a dotted line).

The connectivity pattern 420 of FIG. 4 is a higher-order subgraph with five nodes including center nodes 422 and 424, which correspond to a source ID (e.g., cookie ID) type, as well as an additional node 426 corresponding to an IP address type, an additional node 428 corresponding to a web page type, and an additional node 430 corresponding to a location type. The center nodes 422 and 424 are each linked to each of the additional nodes 426, 428, and 430, however the center nodes 422 and 424 are not linked to one another (illustrated as a dotted line).

The connectivity pattern 432 of FIG. 4 is a higher-order subgraph with k nodes including center nodes 434 and 436 of a source ID type as well as a number of additional nodes 438. The center nodes 434 and 436 are each linked to each of the additional nodes 438, however the center nodes 434 and 436 are not linked to one another (illustrated as a dotted line).

Returning to FIG. 3, the typed higher-order node combination module 306 determines a number of the typed higher-order node combinations 310 between the center nodes i and j. For a typed higher-order node combination that fits a connectivity pattern that is a typed four-cycle with two additional nodes of a same type (for instance, a higher-order node combination that fits the connectivity pattern 400), the number of typed higher-order node combinations 310 may be determined according to $$W_{ij} = \binom{|c_{i,j}^t|}{2}.$$

This may be extended to k-nodes of the same type according to $$W_{ij} = \binom{|c_{i,j}^t|}{k}.$$

In these scenarios, the two additional nodes are of the same type, but that type may be different than a type of the center nodes. Where the two additional nodes are of different types (for instance, the connectivity pattern 410), the typed higher-order node combination module 306 may determine the number of ed higher-order node combinations 310 according to $W_{ij}=|C_{ij}^t|\cdot|C_{ij}^p|$, where $W_{ij}$ is a number of common neighbors shared by i and j for types t and p. As the center nodes are typically of a same type, this can be generally extended fork k node types according to $W_{ij}=\Pi_{l=1}^{k}|C_{ij}^l|=|C_{ij}^1|\cdot|C_{ij}^2|\ldots|C_{ij}^k|$.

To generate the predicted link 130, the linking system 128 further employs a probability module 312. The probability module 312 estimates a weight or similarity between the center nodes based on a number of typed higher-order node combinations 310. For instance, the probability module 312 may determine a typed higher-order Jaccard similarity that is a probability indicating the likelihood that the center nodes should be linked.

The typed higher-order Jaccard similarity for a typed higher-order node combination corresponding to a typed four-cycle with center nodes i and j with additional nodes of a same type is generated according to $$\mathbb{P}_{ij} = \frac{\binom{|c_{i,j}^t|}{2}}{\binom{|\Gamma_i^t \cup \Gamma_j^t|}{2}}.$$

In this scenario, the two additional nodes are of a same type, but that type may be different than a type of the center nodes. Where the two additional nodes of a typed higher-order node combination corresponding to a typed four-cycle are of different types, the typed higher-order Jaccard similarity is generated according to $$\mathbb{P}_{ij} = \frac{|c_{i,j}^t|\cdot|c_{i,j}^p|}{|\Gamma_i^t \cup \Gamma_j^t|\cdot|\Gamma_i^p \cup \Gamma_j^p|}.$$

For example, nodes with type t are IP addresses and nodes with type p are web pages. $\Gamma_i^t$ represents the set of the IP address associated with node i and $\Gamma_i^p$ are the web pages visited by node i. $|\Gamma_i^t\cup\Gamma_j^t|$ can be derived in constant time using the following relationship:

$$(|\Gamma_i^t|-|C_{ij}^t|)+(|\Gamma_j^t|-|C_{ij}^t|)+|C_{ij}^t|=|\Gamma_i^t\cup\Gamma_j^t|$$

Generally, for k node types the typed higher-order Jaccard similarity can be determined according to $$\mathbb{P}_{ij} = \frac{\Pi_{l=1}^k |c_{i,j}^l|}{\Pi_{l=1}^k |\Gamma_i^l \cup \Gamma_j^l|},$$

where $\Pi_{l=1}^{k}|\Gamma_i^l\cup\Gamma_j^l|$ represents a potential number of shared nodes between k types in a (k+l)-partite graph. In this example, the k types are in addition to a type of the center nodes i and j, however the techniques described herein may be applied to a k-partite graph as well.

Figure 5:
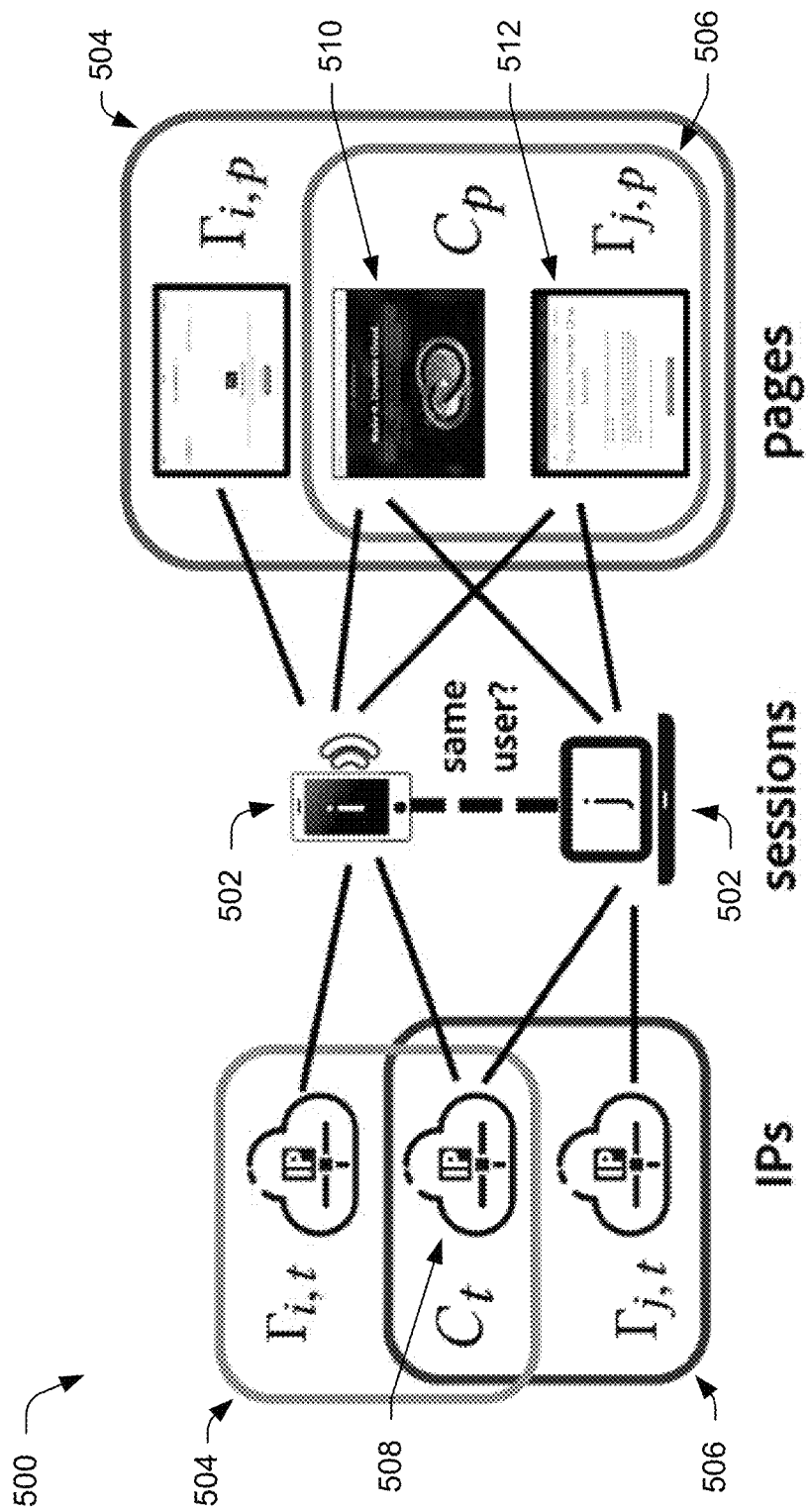
FIG. 5 depicts an example typed higher-order node combination utilized in a higher order node combination probabilistic approach.

The typed higher-order node combination probabilistic approach described above is further illustrated in FIG. 5. FIG. 5 depicts a typed network representation 500 with center nodes 502 (nodes i and j). The center nodes 502 are of a source ID type, and the additional nodes are of an IP address type t and a webpage type p. The node i is linked to the nodes 504 and the node j is linked to the nodes 506. The 'overlap' between the nodes 504 and the nodes 506 includes an IP address node 508, a webpage node 510, and a webpage node 512. In this example, the typed higher-order node combinations 310 correspond to typed four-cycles. A first higher-order node combination corresponding to a typed four-cycle includes the center nodes 502, the IP address node 508, and the webpage node 510, while a second higher-order node combination corresponding to a typed four-cycle includes the center nodes 502, the IP address node 508, and the webpage node 512. Thus, two typed higher-order node combinations corresponding to typed four-cycles exist for the center nodes 502 where a four-cycle includes different types for the additional nodes. Had each of the center nodes 502 been respectively linked to every one of the nodes in the typed network representation 500, there would have been nine typed higher-order node combinations corresponding to typed four-cycles for the center nodes 502. Accordingly, the probability module 312 in this example determines a typed higher-order Jaccard similarity of ⅔ for the center nodes 502.

Returning to FIG. 3, the probability module 312 utilizes the typed higher-order Jaccard similarity to estimate a link strength or quality between arbitrary center nodes, but may also rank links or edges that are most likely to be formed, determine potential links with a highest quality, determine a confidence measure of potential links, and so forth. The typed higher-order Jaccard similarity may be used by itself as a probability of the predicted link 130 existing. Alternatively, the probability module 312 may additionally employ weighting factors 314.

Figure 6:
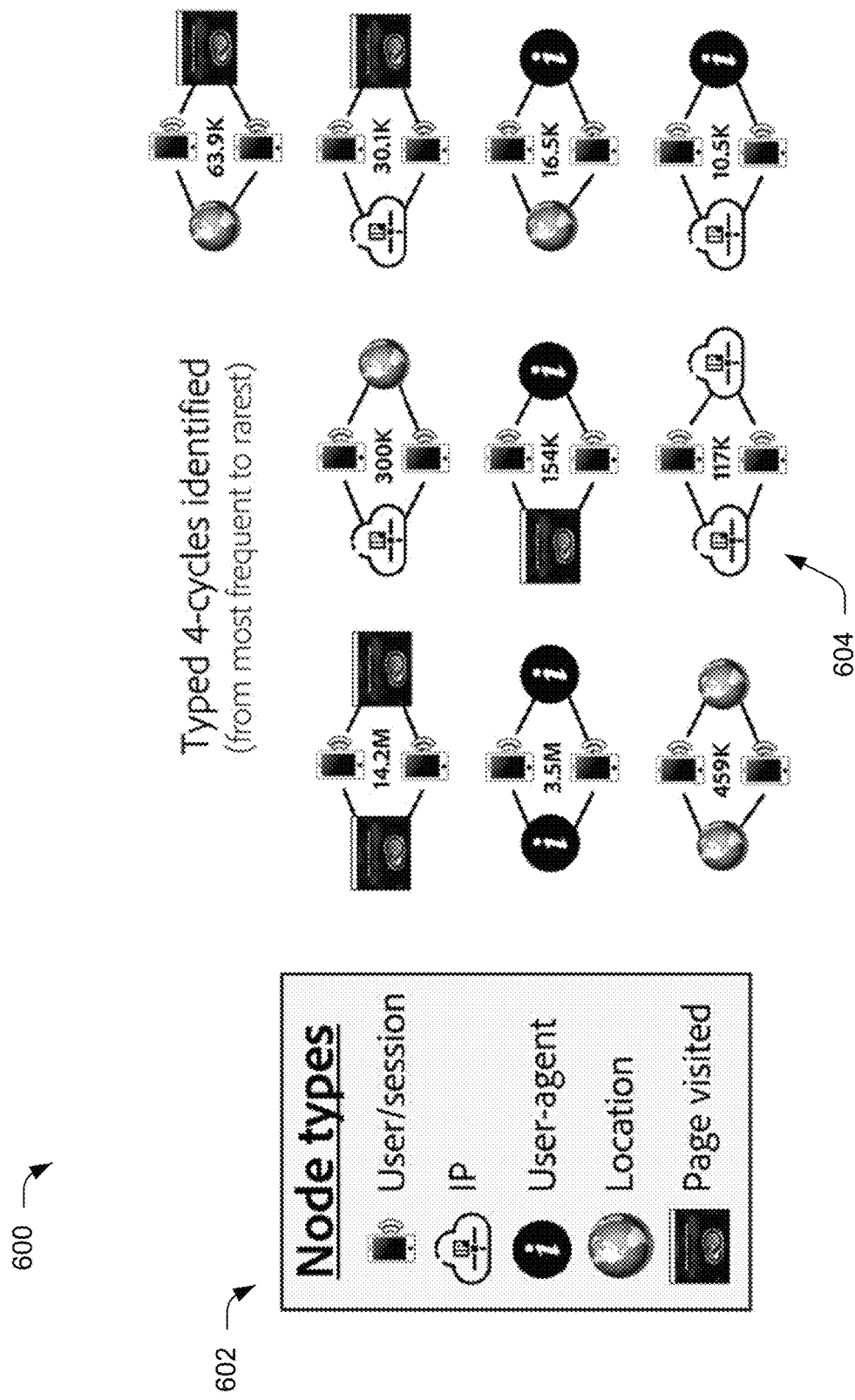
FIG. 6 depicts example typed four-cycle connectivity patterns for an example five-partite graph.

For instance, the probability module 312 may adjust the typed higher-order Jaccard similarity according to a connectivity pattern of a higher-order node combination. Examples of connectivity patterns are illustrated in FIG. 6. FIG. 6 depicts an example 600 for a five-partite network representation with four node types 602 aside from the center node type of User/session (e.g., source ID): IP, User-agent (e.g., source agent), Location, and Page visited. Given these node types 602, there are ten possible typed four-cycle connectivity patterns with center nodes of a source ID type, illustrated as the connectivity patterns 604. A sample dataset was analyzed according to the connectivity patterns 604, and the frequency of node combinations corresponding to each connectivity pattern 604 is illustrated as a number in the center of the respective connectivity pattern. For instance, the sample dataset included 14.2 million node combinations corresponding to typed four-cycles with a connectivity pattern including two page-visited nodes, and 300,000 node combinations corresponding to typed four-cycles with a connectivity pattern including an IP node and a location node.

Returning to FIG. 3, the probability module 312 may leverage the frequency of the various connectivity patterns as weighting factors 314. For instance, each connectivity pattern may have different thresholds or weights applied to indicate the quality of the associated connectivity pattern. As an example, highly frequent connectivity patterns such as two source IDs linked to two different web pages provide lower quality information as compared to less frequent connectivity patterns such as two source IDs linked to an IP address and a source agent.

Some node types are much stronger indicators of two devices belonging to the same person or household than other node types, and the weighting factors 314 reflect these strengths. For instance, two source IDs that are linked to four unique IP addresses (from among a smaller set of IP addresses) are much more likely to belong to the same source than two source IDs that are linked to the same four web pages (from among thousands or millions of pages viewed). Thus, nodes that are strong indicators of common ownership are given a higher weight while nodes that are weak indicators of common ownership are given a lower weight via the weighting factors 314.

An example weighting factor 314 leverages an insight that node types with fewer unique values per source ID provide stronger indicators than node types with a high number of unique values per source ID. Types with fewer total unique values per source ID may be given a higher weight than types with higher total unique values per source ID. For example, IP addresses are given a higher weight than web pages viewed, as generally there are fewer unique IP addresses linked to a source ID as compared to web pages linked to a source ID. This example weighting factor may further incorporate a number of unique values across all source IDs. For instance, although a gender type will include few unique values per source ID, there are few unique values across all source IDs and two source IDs sharing a value for a gender type have a low probability of belonging to a same owner. In contrast, IP addresses include few unique values per source ID, but are taken from a pool of millions of IP addresses across all source IDs, and thus two source IDs sharing a value for an IP address may have a high probability of belonging to a same owner.

Further, the weighting factors 314 may incorporate a frequency of values associated with a particular node. For instance, if a center node is linked to a location node, the probability module 312 may consider a number of entries in the interaction dataset 118 that associate the center node with the location node. As an example, consider a device (e.g., associated with a particular source ID) that is linked to two different locations. A location that the device visits often (e.g., home, workplace, a favorite coffee shop) is a higher quality indicator than a location that the device has visited only once (e.g., a friend's home, a client's workplace, a random public venue). Thus, a node or edge may be weighted based on a frequency of visits a particular center node has to the additional node.

Another example weighting factor 314 includes a weighting factor that is inversely proportional to the popularity of a node. In the context of web page nodes, a weighting factor may weight individual nodes inverse to the number of page visits for each respective web page. The home page of a website typically receives many more visits than any particular subpage of a website, and thus visits to the home page are less informative than visits to subpages. Thus, popular nodes may be given a lower weight, while less popular nodes may be given a higher weight. As another example, a weighting factor may weight a location node inverse to the number of unique devices that are linked to the location node. Such a weighting factor may be extended to incorporate a popularity of pairs of nodes. For instance, a weighting factor may weight a particular connectivity pattern inversely proportional to a number of typed higher-order node combinations corresponding to the connectivity pattern in the interaction dataset 118 that include the same additional nodes.

Further, given the poor quality of indications provided by visits to popular webpages, the example weighting factor 314 may optionally impose a threshold number of different web pages included in the filtered network representation 304 before assigning weight to any web pages linked to center nodes. For instance, all nodes of a web page type may be given zero weight if there are fewer than a threshold number of web page type nodes linked to the center nodes. If the number of web page type nodes linked to the center nodes exceeds the threshold number, each web page type node may be given a respective weight according to the other weighting factors 314.

Another example weighting factor 314 is based on an accuracy of a node, such that more accurate nodes are given higher weights while less accurate nodes are given lower weights. For instance, a location type node may derive from a number of sources including an IP address, a Wi-Fi network, a GPS location, and so forth. An IP address is often accurate to within a zip code, while a GPS location may be accurate to within ten feet or less. Thus, matching location nodes based on a GPS location provide a higher quality indication and are weighted higher in this example than matching location nodes based on IP addresses which provide a lower quality indication.

Further, the probability module 312 may assign low or no weight to nodes that are determined to provide duplicitous information. For example, a location node linked to a source ID may be derived from an IP address, while the source ID is also linked to a corresponding IP address node. In this example, the location node provides no additional information beyond that of the IP address node, and the location node may be assigned little or no weight.

The probability module 312 may further utilize temporal constraints in relation to the weighting factors 314. For many node types, matches are more meaningful if they occur together for a particular source ID within a short time period of each other. As an example, if two source IDs are linked to locations of San Jose and Cairo, they are more likely to be related if the dates are aligned for the San Jose nodes and separately aligned for the Cairo nodes. In this example, two source IDs that are each linked to a San Jose node on May $1^{st}$ and linked to a Cairo node on June $1^{st}$ have a high probability of being related. In contrast, if the second source ID is instead linked to the San Jose node on June $1^{st}$ and linked to the Cairo node on May $1^{st}$, there is a very low probability of the source IDs being related, as it is unlikely that the same source was in both San Jose and Cairo on both May $1^{st}$ and June $1^{st}$.

The temporal constraints may be applied based on node type. For instance, location nodes may have different temporal constraints applied based on a distance between the location nodes. As an example, distant locations may allow for larger time periods of overlap (e.g., San Jose and Cairo may overlap within days or weeks) as few source IDs will link to both nodes, while close locations may allow for shorter time periods of overlap (e.g., San Jose and Sunnyvale may overlap within minutes or hours) as many source IDs will link to both nodes.

The linking system 128 may operate in an online manner where the network representation is continuously streaming over time with new data points. In this scenario, new edges and new nodes arrive in any arbitrary order and the weights are updated by the arrival of a new edge or node without reevaluating all values. Thus, the techniques described herein are amenable to streaming and incremental online updates. Given a new edge (i,r) arriving at time t where i is of type $t_1$ and node r is of type $t_2$, then (i,r) is simply added to the network representation, and all links or weights that could be impacted by insertion of the new edge are updated. The pruning factors 302 may be applied by the filtering system 126 prior to adding the new edge into the network representation. This may be performed for a set S of incoming edges, such as source ID-web page edges, source ID-location edges, source ID-source-agent edges, source ID-time edges, and so forth. This allows for real-time visitor stitching.

The analytics system entity resolution techniques described herein are a technological improvement over conventional prediction models. Entity stitching was performed on a sample dataset using typed higher-order node combination techniques as described herein and compared to a probabilistic approach. The experimental results are shown in the table 700 of FIG. 7. The analytics system entity resolution techniques achieve an improvement in recall of 3.6% over the people+ probabilistic approach. γ indicates a degree of filtering applied, however the filtering in this experiment is notably applied uniformly across all node types, and greater improvements are achieved using type based filtering as described herein. The "removed 2P-2S" results shown in table 700 refer to a typed higher-order node combination technique performed wherein the connectivity pattern of a typed four-cycle including two source IDs and two pages visited are omitted from the connectivity patterns. The "removed 2P-2S" results further increase the precision and the F score compared to the base higher-order node combination results, at a slight expense to the recall. As seen in table 700 of FIG. 7, the analytics system entity resolution techniques described herein are a technological improvement over conventional probabilistic approaches to entity stitching.

Further, the analytics system entity resolution techniques described herein utilize higher-order relationships without a higher-order computational complexity. In the worst case, the time complexity is $O(\Delta_t+\Delta_p)$, where $\Delta_t$ and $\Delta_p$ are the maximum degree of a node with type t and p, respectively. For a single pair of nodes i and j, the time complexity is $O(|\Gamma_i^t|+|\Gamma_j^t|+|\Gamma_i^p|+|\Gamma_j^p|)$. More generally, the time complexity may be represented for k number of types as $O(\Sigma_{t=1}^k|\Gamma_i^t|+|\Gamma_j^t|)=O(|\Gamma_i|+|\Gamma_j|)$. In the worst case, the space complexity for connectivity patterns with two types is $O(\Delta_t+\Delta_p+N)$, where $N=|V|$. If a hash table is used to derive $C_{ij}^t$ and $C_{ij}^p$, the space complexity may be generally represented as $O(N+\Sigma_{t=1}^t\Delta t)=O(N+\Delta)$, where $\Delta$ is the maximum node degree without considering node type. However, if memory is limited (e.g., GPUs), then the hash table can be avoided by using a binary search over the neighbors, which gives a space complexity of $O(\Delta_t+\Delta_p)$ at the expense of time. Alternatively, one can also leverage bloom filters and so forth. Thus, the analytics system entity resolution techniques described herein are a technological improvement that can increase the efficiency of a computing device.

Example Procedures

The following discussion describes techniques that may be implemented utilizing the previously described systems and devices. Aspects of the procedures may be implemented in hardware, firmware, software, or a combination thereof. The procedures are shown as sets of blocks that specify operations performed by one or more devices and are not necessarily limited to the orders shown for performing the operations by the respective blocks. In portions of the following discussion, reference will be made to FIGS. 1-7.

Figure 8:
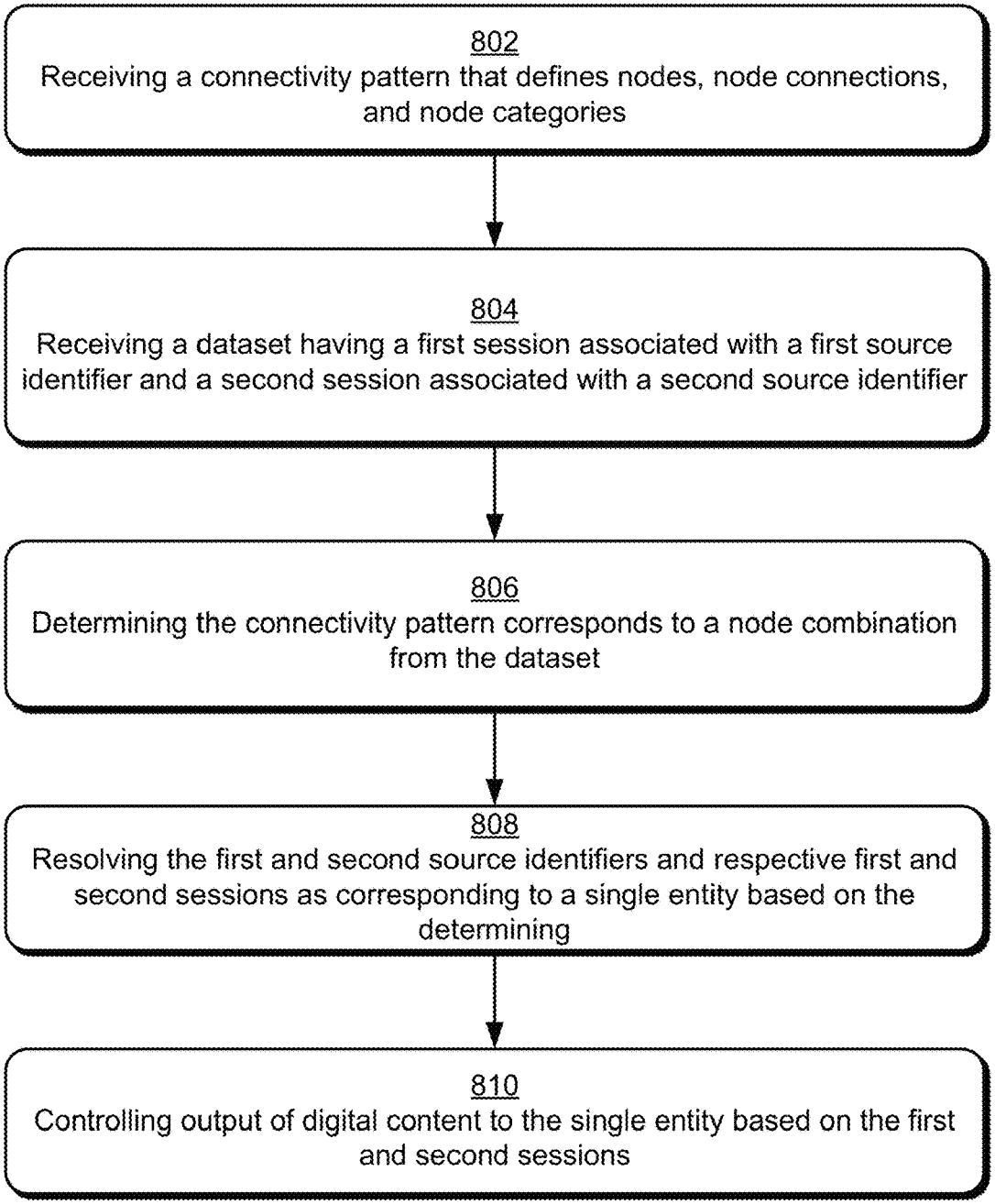
FIG. 8 is a flow diagram depicting a procedure in an example implementation of analytics system entity resolution techniques.

FIG. 8 depicts a procedure 800 in an example implementation of analytics system entity resolution techniques. A connectivity pattern defining nodes, node connections, and node categories is received (block 802). The connectivity pattern includes a specified structure of nodes, but does not define specific nodes that fit the specified structure. The structure includes nodes associated with node categories, and node connections between ones of the nodes. As an example, the connectivity pattern may be a typed four-cycle that defines two center nodes and two additional nodes, such that each additional node is connected to each of the center nodes, but the center nodes are not directly connected to one another. In this example, each of the four specified nodes are associated with a respective node category. The node categories may include, for instance, source IDs, web pages, locations, IP addresses, user agents, and so forth.

A dataset having a first session associated with a first source identifier and a second session associated with a second source identifier is received (block 804). This may involve, for instance, receiving a dataset describing interactions with a heterogeneous or typed network as described above. The dataset describes categories (e.g., types), nodes that are each associated with a category, and node associations that link ones of the nodes to other ones of the nodes. For example, the dataset may include a node with a type of "IP address", such that the node contains a value indicating a particular IP address. Each of the nodes in the dataset are associated with at least one source identifier, such as the first and/or second source identifiers. In some implementations, a source identifier is contained within a source ID node, and nodes associated with the source identifier are connected to the source ID node. A session includes all nodes that are associated with the same source identifier.

The connectivity pattern is determined as corresponding to a node combination from the dataset (block 806). At least one combination of nodes in the dataset are identified as fitting the connectivity pattern, with the node combination having nodes that include the first and second source identifiers, node connections corresponding to the node connections of the connectivity pattern, and node categories corresponding to the node categories of the connectivity pattern. For example, a connectivity pattern includes a location node and a website node each connected to a first source ID node and a second source ID node, and the node combination includes a particular location node within the dataset (e.g., a location node containing "Washington") and a particular website node within the dataset (e.g., a website node containing "adobe.com") each connected to particular source ID nodes within the dataset (e.g., a first source ID node containing "source 1" and a second source ID node containing "source 2"). In some implementations, a plurality of connectivity patterns are determined as corresponding to a plurality of node combinations from the dataset. For instance, a first connectivity pattern is determined as corresponding to a plurality of node combinations, and a second connectivity pattern is determined as corresponding to another plurality of node combinations.

The first and second source identifiers and respective first and second sessions are resolved as corresponding to a single entity based on the determining (block 808). This includes, for instance, determining an amount of similarity between the first and second source identifiers and predicting a link between the first and second source identifiers. The amount of similarity may be a probability indicating the likelihood that two nodes should be linked within the dataset, such as a likelihood that two nodes correspond to a same source or entity. Based on the amount of similarity, a predicted link is generated that indicates that the nodes correspond to a same source. For a predicted link between two source ID nodes, it is resolved that the first and second source identifiers and respective first and second sessions correspond to a single entity. The determination of similarity may involve utilizing weighting factors as described with respect to FIG. 3. The predicted link may represent an amount of confidence or probability and so forth, or may be generated in a binary manner such as determining that a link exists if the amount of similarity exceeds a threshold amount. Accordingly, resolving the first and second source identifiers as corresponding to a single entity in some implementations includes an amount of confidence or probability that the first and second source identifiers correspond to a single entity. Upon resolving the first and second source identifiers as corresponding to a single entity, nodes associated with the first and second source identifiers may be associated with a single source identifier such as by replacing first and second source ID nodes with a single source ID node that is linked to each node that was connected to at least one of the first and second source ID nodes. In doing so, information associated with the first session and information associated with the second session may be merged into a single profile or otherwise combined to create a singular repository of information pertaining to the single entity.

Output of digital content to the single entity is controlled based on the first and second sessions, e.g. by controlling output of digital content to a client device associated with the single entity (block 810). For example, a digital marketing system may utilize the resolved first and second source identifiers to track activities or behaviors associated with the single entity. The digital marketing system determines an interest associated with the single entity based on the tracked activities or behaviors, and selects digital content based on the determined interest. The digital content is then output to a client device associated with the single entity.

Having discussed some example procedures, consider now a discussion of an example system and device in accordance with one or more implementations.

Example System and Device

Figure 9:
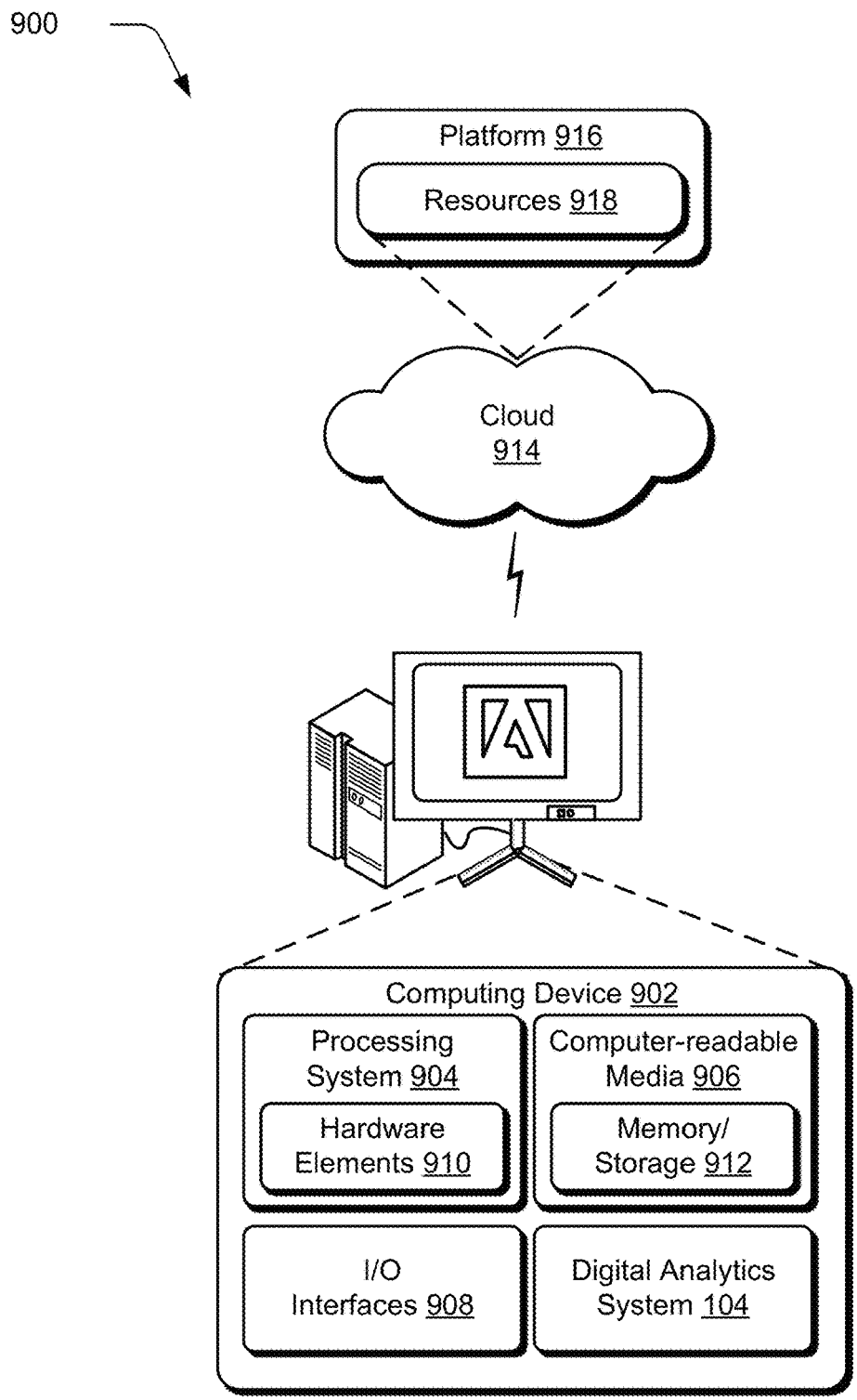
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the digital analytics system 104. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   receiving, by the at least one computing device, a connectivity pattern that defines a typed four cycle including a plurality of nodes having two center nodes and at least two additional nodes, each of the two center nodes linked via respective edges to both of the at least two additional nodes, two center nodes associated with a first node category of a source identifier and the at least two additional nodes associated with at least a second node category;
   receiving, by the at least one computing device, a dataset comprising a node combination having:
      nodes that include a first source identifier associated with a first session and a second source identifier associated with a second session;

node connections corresponding to at least the node connection of the connectivity pattern; and
node categories corresponding to the first node category and the second node category other than the first node category of the connectivity pattern;
determining that the node combination corresponds to the connectivity pattern;
determining a probability that the first source identifier associated with the first session and the second source identifier associated with the second session correspond to a single entity based on the node combination corresponding to the connectivity pattern;
resolving, by the at least one computing device, the first session associated with the first source identifier and the second session associated with the second source identifier as corresponding to the single entity based on the probability; and
controlling, by the at least one computing device, output of digital content to the single entity based on the first session and the second session.

2. The method of claim 1, wherein determining that the connectivity pattern corresponds to the node combination further includes determining the connectivity pattern corresponds to a plurality of node combinations from the dataset.

3. The method of claim 1, further comprising determining another connectivity pattern corresponds to another node combination from the dataset.

4. The method of claim 1, wherein the second node category is associated with a web page, a location, an IP address, or a source agent.

5. The method of claim 1, wherein the first session and the second session each include a plurality of nodes associated with the second source identifier, wherein the second source identifier corresponds to a web page, a location, an IP address, or a source agent.

6. The method of claim 1, wherein the resolving includes determining an amount of similarity between nodes associated with the first and second source identifiers.

7. The method of claim 6, wherein the amount of similarity is based on a first weighting factor associated with the first category and a second weighting factor associated with the second category.

8. The method of claim 1, wherein the connectivity pattern is a typed four-cycle in which each of the at least two additional nodes is linked via the respective edges to both of the center nodes.

9. The method of claim 8, wherein the typed four-cycle includes two center nodes of a first category and the at least two additional nodes each of the second category.

10. The method of claim 8, wherein the typed four-cycle includes two center nodes of the first category, a first said additional node of the second category, and a second said additional node of a third category.

11. A system comprising one or more processors and one or more computer-readable media that, when executed by the one or more processors, are configured to implement:
a heterogeneous network representation module configured to receive a dataset comprising a node combination having: a first session associated with a first source identifier and a second session associated with a second source identifier and one or more node connections;
a higher-order node combination module configured to:
receive a connectivity pattern that defines a typed four cycle including a plurality of nodes having two center nodes and at least two additional nodes, each of the two center nodes linked via respective edges to both of the at least two additional nodes; and
determine the connectivity pattern corresponds to the node combination from the dataset; and
a linking module configured to:
determine a probability that the first source identifier associated with the first session and the second source identifier associated with the second session correspond to a single entity based on the node combination corresponding to the connectivity pattern; and
resolve the first session associated with the first source identifier and the second session associated with the second source identifier as corresponding to the single entity based on the probability.

12. The system of claim 11, further comprising a digital content control module configured to control output of digital content to the single entity based on the first and second sessions.

13. The system of claim 11, wherein determining that the connectivity pattern corresponds to the node combination from the dataset includes determining the connectivity pattern corresponds to a plurality of node combinations from the dataset.

14. The system of claim 11, wherein the resolving includes determining an amount of similarity between nodes associated with the first and second source identifiers.

15. The system of claim 11, wherein the connectivity pattern is a typed four-cycle in which the two center nodes corresponding to a first category and the at least two additional nodes corresponding to a second category.

16. The system of claim 11, wherein the connectivity pattern is a typed four-cycle in which the two center nodes correspond to a first category and the at least two additional nodes correspond to at least a second category and a third category.

17. A system comprising:
means for receiving a connectivity pattern defining a typed four cycle including a plurality of nodes having two center nodes and two additional nodes, each of the two additional nodes linked via respective edges to both of the center nodes, with the two center nodes including a first node category of a client device, and the two additional nodes associated with at least a second node category other than a client device;
means for receiving a dataset comprising a node combination having:
nodes that include a first source identifier associated with a first session and a second source identifier associated with a second session;
node connections corresponding to at least the node connection of the connectivity pattern; and
node categories corresponding to the first node category of the client device and the second node other than the client device category of the connectivity pattern;
means for determining that the node combination corresponds to the connectivity pattern;
means for determining a probability that the first source identifier associated with the first session and the second source identifier associated with the second session correspond to a single entity based on the node combination corresponding to the connectivity pattern;
means for resolving the first session associated with the first source identifier and the second session associated with the second source identifier as corresponding to the single entity based on the probability; and
means for controlling output of digital content to the single entity based on the first session and the second session.

18. The system of claim 17, wherein the connectivity pattern is a typed four-cycle comprising two center nodes of a source ID category and two additional nodes of different categories than the source ID category.

19. The system of claim 17, wherein the second node category is associated with a web page, a location, an IP address, or a source agent.

20. The method of claim 1, wherein the probability is based on a Jaccard similarity associated with the first source identifier and the second source identifier.

* * * * *